United States Patent [19]
Liebig et al.

[11] 4,205,141
[45] May 27, 1980

[54] THERMOPLASTIC MOULDING COMPOSITIONS

[75] Inventors: Lothar Liebig; Frank Wingler, both of Leverkusen; Gert Humme, Odenthal; Richard Prinz, Leverkusen, all of Fed. Rep. of Germany

[73] Assignee: Bayer Aktiengesellschaft, Leverkusen, Fed. Rep. of Germany

[21] Appl. No.: 852,630

[22] Filed: Nov. 18, 1977

[30] Foreign Application Priority Data

Nov. 23, 1976 [DE] Fed. Rep. of Germany ....... 2653146

[51] Int. Cl.$^2$ .............................................. C08L 67/06
[52] U.S. Cl. .......................................... 525/67; 525/74
[58] Field of Search ............................................ 263/873

[56] References Cited

U.S. PATENT DOCUMENTS

| | | | |
|---|---|---|---|
| 3,880,783 | 4/1975 | Serini | 260/873 |
| 3,882,192 | 5/1975 | Elghani | 260/873 |
| 3,891,719 | 1/1975 | Schirmer | 260/873 |
| 3,988,390 | 10/1976 | Prinz | 260/873 |
| 4,028,433 | 6/1977 | Prinz | 260/873 |

Primary Examiner—Paul Lieberman

Attorney, Agent, or Firm—Connolly and Hutz

[57] ABSTRACT

A thermoplastic moulding composition comprising:
(1) 80 to 20 parts by weight of a thermoplastic polycarbonate based on a dihydroxy diarylalkane,
(2) 0 to 60 parts by weight of a graft copolymer of a
(2.2) monomer mixture of
(2.2.1) 95 to 50% by weight of styrene, methyl methacrylate or a mixture thereof; and
(2.2.2) 50 to 5% by weight of acrylonitrile, methacrylonitrile or a mixture thereof, polymerized onto
(2.1) a rubber which has a glass temperature below −20° C., and which contains less than 30 C=C-double bonds per 1,000 carbon atoms, the moulding composition containing from 0 to 35% by weight of the rubber (2.1), and
(3) 5 to 75 parts by weight of a copolymer which is chemically uniform in structure and comprises:
(3.1) 95 to 50% by weight of styrene, methyl methacrylate or a mixture thereof;
(3.2) 40 to 5% by weight of acrylonitrile, methacrylonitrile or a mixture thereof; and
(3.3) 2 to 30% by weight of maleic acid anhydride, the sum of 3.1, 3.2 and 3.3 being equal to 100% by weight.

6 Claims, No Drawings

THERMOPLASTIC MOULDING COMPOSITIONS

This invention relates to thermoplastic moulding compositions consisting of a mixture of dihydric phenol polycarbonates and thermoplastic resins, primarily based on styrene, acrylonitrile and maleic acid anhydride, which are optionally elasticised with a graft polymer of resin-forming monomers on a rubber.

German Auslegeschrift No. 1,170,141 describes mixtures of a polycarbonate of aromatic dihydroxy compounds with graft polymers of polybutadiene and a mixture of acrylonitrile and an aromatic vinyl hydrocarbon. By comparison with pure polycarbonates, these mixtures show improved thermoplasticity and greatly improved moulding properties. However, these improvements are obtained at the expense of other important properties of the polycarbonate (for example its tensile strength and its resistance to light and weather). In particular, the thermal stability of these mixtures is distinctly reduced so that these mixtures cannot be universally used as moulding compositions.

An object of the present invention is to provide polycarbonate-containing thermoplastic moulding compositions having improved moulding properties without any deterioration in the essential properties of the polycarbonates, especially their dimensional stability under heat and their toughness.

It has now been found that thermoplastic moulding compositions which are produced by mixing a bis-(hydroxyaryl)-alkane polycarbonate with a special thermoplastic resin of styrene, acrylonitrile and maleic acid anhydride and which are optionally elasticised with a graft polymer of resin-forming monomers on a rubber, show improved flow properties and retain the essential properties of the polycarbonate such as, for example, its excellent mechanical and thermal properties.

Accordingly, the present invention provides thermoplastic moulding compositions of:
1. 80 to 20 parts by weight of a thermoplastic polycarbonate based on bis-(hydroxyaryl)-alkanes,
2. 0 to 60 parts by weight of a graft polymer of a
   2.2. monomer mixture, polymerised in the presence of
   2.1. a rubber, of
   2.2.1. 95 to 50% by weight of styrene, methyl methacrylate or mixtures thereof; and
   2.2.2. 50 to 5% by weight of acrylonitrile, methacrylonitrile or mixtures thereof, and
3. 5 to 75 parts by weight of a copolymer of
   3.1. 95 to 50 parts by weight of styrene methyl methacrylate or mixtures thereof;
   3.2. 40 to 5 parts by weight of acrylonitrile, methacrylonitrile or mixtures thereof; and
   3.3. 2 to 30 parts by weight of maleic acid anhydride which are distinguished by the fact that
(a) the rubber has a glass temperature below $-20°$ C.,
(b) the rubber contains less than 30 C=C-double bonds per 1000 carbon atoms,
(c) the copolymer (3) has a chemically uniform structure,
(d) the moulding composition contains from 0 to 35% by weight and preferably from 10 to 30% by weight of the rubber (2.1).

The copolymer (3) preferably consists of 15 to 30 parts by weight of acrylonitrile, 7.5 to 15 parts by weight of maleic acid anhydride and 77.5 to 55 parts by weight of styrene.

A rubber (2.1) content in the moulding compositions of from 5 to 25% by weight is particularly preferred.

Compared with conventional moulding compositions, for example according to German Auslegeschrift No. 1,170,141, the moulding compositions according to the invention show improved resistance to hot water, distinctly increased thermal stability under load and improved flow properties.

Even in the absence of the graft polymer (2), the moulding compositions according to the invention surprisingly show a relatively high degree of toughness which is sufficient for numerous applications where the primary requirement is a high dimensional stability under heat. However, one particular advantage is that these "binary mixtures" can be considerably improved in their toughness by the addition of a graft polymer, so that impact strength values of from 8 kg/cm² to unbroken and Vicat-B-values of from 115° C. to 140° C. can be achieved as required.

In the context of the invention, aromatic polycarbonates are homopolycarbonates and copolycarbonates based for example on one or more of the following bisphenols:

dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones, $\alpha,\alpha$-bis-(hydroxyphenyl)-diisopropylbenzenes, and also their nucleus-alkylated and nucleus-halogenated derivatives. These and other suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846; in German Offenlegungsschrifts Nos. 1,570,703; 2,063,050; 2,063,052; 2,211,956 and 2,211,957; in French Pat. No. 1,561,518 and in the book by H. Schnell entitled "Chemistry and Physics of Polycarbonates", Interscience Publishers, New York, 1964.

Preferred bisphenols are those corresponding to the formula (I):

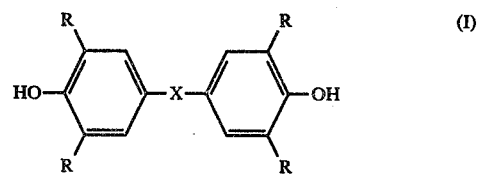

in which R is the same or different in each position and represents H, $C_1$–$C_4$-alkyl, Cl or Br, and X represents a single bond $C_1$–$C_8$-alkylene, $C_2$–$C_8$-alkylidene, $C_5$–$C_{15}$-cycloalkylene, $C_5$–$C_{15}$-cycloalkylidene, —$SO_2$— or

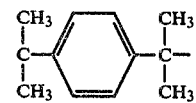

Examples of these bisphenols are 4,4'-dihydroxy diphenyl, 2,2-bis-(4-hydroxyphenyl)-propane, 2,4-bis-(4-hydroxyphenyl)-2-methyl butane, 1,1-bis-(4-hydroxyphenyl)-cyclohexane, $\alpha,\alpha$-bis-(4-hydroxyphenyl)-p-diisopropyl benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methyl butane, 1,1-bis-(3,5-dimethyl-4-hydroxyphenyl)-cyclohexane, α,α-bis-(3,5-dimethyl-4-hydroxyphenyl)-p-diisopropyl benzene, 2,2-bis-(3,5-dichloro-4-hydroxyphenyl)-propane and 2,2-bis-(3,5-dibromo-4-hydroxyphenyl)-propane.

Particularly preferred bisphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred aromatic polycarbonates are those based on one or more of the preferred bisphenols mentioned above. Particularly preferred polycarbonates are copolycarbonates based on 2,2-bis-(4-hydroxyphenyl)-propane and one of the other particularly preferred bisphenols mentioned above. Other particularly preferred polycarbonates are polycarbonates based on 2,2-bis-(4-hydroxyphenyl)-propane alone or on 2,2-bis-(3,5-dimethyl-4-hydroxyphenyl)-propane alone.

The aromatic polycarbonates can be produced by known methods, for example by the melt transesterification process, from bisphenols and diphenyl carbonate and by the two-phase interfacial process from bisphenols and phosgene, as described in the above-mentioned literature.

The aromatic high molecular weight polycarbonates may be branched by the incorporation of small quantities, preferably between 0.05 and 2.0 mole % (based on the diphenols used), of compounds with a functionality of three or more than three, particularly with those containing three or more phenolic hydroxy groups.

Polycarbonates of this type are described, for example, in German Offenlegungsschrifts Nos. 1,570,533; 1,595,762; 2,116,974; 2,113,347; in British Pat. No. 1,079,821; in U.S. Pat. No. 3,544,514 and in German Offenlegungsschrift No. 25 00 092.

Some of the compounds containing three or more than three phenolic hydroxy groups which may be used in accordance with the invention are, for example, phloroglucinol, 4,6-dimethyl-2,4,6-tri-(4-hydroxyphenyl)-2-heptane, 4,6-dimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxy-phenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are, for example, 2,4-dihydroxybenzoic acid, trimesic acid, cyanuric chloride and 3,3-bis(4-hydroxyphenyl)-2-oxo-2,3-dihydroindole.

The aromatic high molecular weight polycarbonates preferably have average molecular weights (weight averages) $\overline{M}_w$ of at least 10,000, more especially from 10,000 to 200,000 and preferably from 20,000 to 80,000, as determined by measuring relative viscosity in $CH_2Cl_2$ at 25° C. and with a concentration of 0.5% by weight.

The graft polymers (2) are obtained by polymerising monomers, preferably styrene and acrylonitrile, in the presence of a rubber. The monomers used for the graft polymerisation reaction are at least partly chemically joined ("grafted on") to the rubber. In general, only part of the styrene and acrylonitrile is in fact grafted on. In addition to the styrene-acrylonitrile graft polymer actually grafted on, ungrafted styrene-acrylonitrile copolymer is generally present as well. The graft copolymers may be obtained in known manner by the radical polymerisation of styrene and acrylonitrile in the presence of the rubber in bulk, emulsion, suspension or solution and by combined processes such as bulk/suspension polymerisation or solution/precipitation polymerisation.

The rubbers used must have a glass temperature below −20° C. and must contain less than 30 C=C-bonds per 1000 carbon atoms. Examples of rubbers such as these are ethylene-propylene-diene rubbers, polyacrylic acid esters and copolymers of ethylene and vinyl acetate. The non-polar ethylene-propylene-diene rubbers (EPDM rubbers) are readily soluble in non-polar monomers, such as styrene or methyl styrene, but are precipitated when polar monomers, such as acrylonitrile, are added. However, the components are kept in solution by the addition of non-polar hydrocarbons as solvents.

Accordingly, corresponding graft polymers are preferably obtained by dissolving for example an ethylene-propylenedicyclopentadiene rubber in aromatic solvents, subsequently adding the graft monomers, for example styrene and acrylonitrile, and initiating the polymerisation reaction by heating and adding a radical forming initiator.

The above difficulties are also avoided if the comonomer acrylonitrile is added to the EPDM rubber solution in styrene according to a predetermined dosing programme during the polymerisation reaction, thereby preventing the rubber from precipitating (cf. German Offenlegungsschrift No. 22 62 610).

Where ethylene/vinyl acetate copolymers are used as the graft base for the graft polymers, polymerisation can also be carried out in solution. It is also possible to add water to the solution of rubber in styrene and acrylonitrile in such a quantity that the organic medium still forms the continuous phase, to form a suspension of the prepolymer in water by adding more water after a certain monomer conversion has been reached and to complete the polymerisation reaction in suspension.

The copolymer (3) is chemically uniform in structure and has an intrinsic viscosity ($\eta$), as measured in dimethyl formamide at 25° C., of from 0.5 to 1.0. Chemically uniform copolymers are only formed if the ratio of the concentrations individual monomers is kept constant during the polymerisation reaction. In practice, this is feasible only when the copolymerisation reaction is carried out continuously ("monomer input process"). In this context, chemically uniform means that the distribution of the monomer units within a given polymer molecule is uniform and that all polymer molecules have the same monomer distribution.

Thus, the continuous polymerisation of a mixture of 74% by weight of styrene, 22% by weight of acrylonitrile and 4% by weight of maleic acid anhydride yields chemically uniform copolymer (component (3)) which is suitable for the moulding compositions according to the invention. By contrast, the copolymer formed from the same monomer mixture by batch-type copolymerisation is unsuitable.

Copolymers (3) of which the acrylonitrile content is similar or equal to that of the styrene-acrylonitrile-graft polymers (2) are particularly suitable for the moulding compositions according to the invention. By varying the maleic acid anhydride content of the copolymers (3), it is possible to adjust dimensional stability under heat. Thus, the dimensional stability under heat of the moulding compositions is independent not only on its total content of copolymers (3), but also on the composition of copolymer (3).

Chemically uniform copolymers of the above-mentioned monomers (with statistical distribution of the monomer units) and their production are known (cf. U.S. Pat. Nos. 3,336,267 and 2,769,804).

The moulding compositions according to the invention can be produced at relatively low temperatures in known mixing units.

For example, mixing rolls, twin-screw extruders and internal mixers are suitable. Fillers, glass fibres, pigments or other additives such as stabilisers, flameproofing agents, lubricants, mould-release agents and antistatic agents, may be added during mixing of the components.

The dimensional stability under heat of the moulding compositions according to the invention is significantly higher than that of comparable moulding compositions, for example of polycarbonate based on 2,2-bis-(4-hydroxyphenyl)-propane (BPA-polycarbonate) and graft polymer and styrene acrylonitrile copolymer (SAN-polymer). Thus, known mixtures of polycarbonate, graft polymer of styrene and acrylonitrile on rubber and styrene-acrylonitrile copolymer with a polycarbonate content of up to 50% have heat distortion temperatures (according to Vicat B) of at most 110° C. (cf. Comparison Examples Table 1); if the proportion of graft polymer is increased (more rubber), heat distortion temperatures (Vicat B) of around 100° C. are obtained. By contrast, the moulding compositions according to the invention with equivalent polycarbonate and rubber contents have distinctly higher heat distortion (Vicat B) temperatures of around 120° C. (cf. Tables 2 and 1), and very high toughness corresponding to the rubber content.

The known moulding compositions always contain a graft polymer which provides for the necessary toughness.

By contrast, even in the absence of graft polymer, the moulding compositions according to the invention show adequate impact strength for numerous applications, particularly where high dimensional stability under heat is primarily required. Providing a lower dimensional stability under heat is acceptable, the toughness of the moulding compositions according to the invention can be further improved by the addition of graft polymers.

Accordingly, it is possible by suitably combining the three components to cover a broad property range of the moulding compositions (particularly as to toughness and dimensional stability under heat).

The moulding compositions according to the invention can be used for applications requiring high resistance to weathering, high dimensional stability under heat, good resistance to hydrolysis and saponification, high toughness and easy processibility, for example for pipes carrying hot alkaline or acid solutions, high-quality seals, for tableware, for instruments sterilisable with superheated steam, for parts of washing machines, for battery containers, for dry-battery housings, for housings and other insulating components in electrically driven machines, for electrical insulating films, for hydrolysis-stable vessel linings and for chemically and thermally stable filter cloths.

In the following Examples, the parts quoted represent parts by weight and the percentages percent by weight.

EXAMPLE 1

Production of a graft polymer based on EPDM rubber 48 parts of ethylene-propylene-dicyclopentadieneterpolymer rubber (iodine number 11, Mooney 70) are dissolved in 300 parts of benzene. 37.5 parts of styrene and 14.5 parts of acrylonitrile are added and the solution is heated to 120° C. Following the addition of 0.9 part of di-tert.-butyl peroxide, polymerisation is carried out over a period of 12 hours. 0.5 part of 2,6-di-tert.-butyl-p-cresol is then added to the polymer solution and the graft polymer is isolated by distillation with steam. The graft polymer is dried at 70° C. in a vacuum drying cabinet.

EXAMPLE 2

Production of a graft copolymer of styrene and acrylonitrile on an ethylene-vinyl acetate copolymer In a 12 liter capacity autoclave equipped with an anchor impeller stirrer, 1000 g of an ethylene-vinyl acetate copolymer with a vinyl acetate content of 45% are dissolved at 80° C. in 960 g of styrene. 318 g of acrylonitrile, 250 ml of a 10% dispersant solution (the dispersant is a 1:1 copolymer of methacrylic acid and methyl methacrylate, pH-value of the dispersant solution: 6.5), 2500 ml of water and 0.8 g of sodium pyrosulphite are introduced into the resulting solution. The mixture is heated to 140° C. in a nitrogen atmosphere. After stirring for 30 minutes at 140° C., a solution of 8 g of di-(tert.-butyl)-peroxide in 80 g of allyl acetate is added over a period of 1 hour, followed by the addition over a period of 2 hours of a solution of 8 g of sodium hydrogen phosphate and 1.5 g of a sodium alkyl sulphonate containing from 12 to 14 carbon atoms in the alkyl chain in 2000 ml of water. After the solutions have been added, the mixture is stirred for another 4 hours at 140° C. Following removal of the residual monomers and careful washing, 1600 g of a bead polymer are obtained with an acrylonitrile content of 13.0%, an ethylene-vinyl acetate copolymer content of 62.5% and a styrene content of 24.5%.

EXAMPLE 3

Production of a terpolymer of styrene, acrylonitrile and maleic acid anhydride (SAMA-copolymer)

2000 parts of a solution of 7260 parts of styrene, 2200 parts of acrylonitrile, 440 parts of maleic acid anhydride and 25 parts of tert.-dodecyl mercaptan are introduced into a non-jacketed reaction vessel equipped with a paddle stirrer, temperature sensor and an inlet and outlet pipe. The contents of the reactor are then heated to 95° C. and the polymerisation reaction is initiated at that temperature, the above-mentioned solution being introduced into the reactor in a throughput of 2000 parts per hour and being simultaneously removed in the same quantity. The indicator is also continuously added to the reaction at a rate of 0.6 part of tert.-butyl perpivalate (75% in dibutyl phthalate) per hour so that a polymer solution with a solids content of approximately 30% is formed after about 2 hours. The polymer solution flowing off has 0.1% by weight of 2,6-di-tert.-butyl-p-cresol added to it and is then freed both from the monomers and from the volatile constituents in an evaporation extruder. The SAMA-copolymer contains 17% by weight of acrylonitrile, 12% by weight of maleic acid anhydride and 71% by weight of styrene. It has an intrinsic viscosity $[\eta]$ of 0.7 dl/g.

The chemical distribution of the monomer units in the fractions of different molecular weight is shown in the following Table:

| Fraction No. | % by weight | $[\eta]$ | % by weight AN | % by weight MSA | % by weight styrene |
|---|---|---|---|---|---|
| 1 | 4.21 | 1.28 | 18 | 12.3 | 69.7 |
| 2 | 7.25 | 1.09 | 18.6 | 12.7 | 68.7 |
| 3 | 19.16 | 0.96 | 17.2 | 12.9 | 69.9 |
| 4 | 9.73 | 0.86 | 18.6 | 11.9 | 69.5 |
| 5 | 11.14 | 0.77 | 18.4 | 12 | 69.6 |
| 6 | 11.52 | 0.64 | 18.0 | 11.5 | 70.5 |
| 7 | 11.91 | 0.52 | 16.5 | 12 | 71.5 |
| 8 | 26.75 | 0.50 | 13.5 | 12.1 | 74.4 |

Fractionation was carried out from dimethyl formamide with cyclohexane at a temperature of 78° C.

Production of the mixtures

Comparison Example 4

Mixtures of polycarbonate, styrene-acrylonitrile copolymer and graft polymer:

The polycarbonate based on 4,4′-dihydroxy-2,2-diphenyl propane (BPA-PC) had a relative viscosity of 1.28, as measured on a solution of 0.5 g of polycarbonate in 100 ml of methylene chloride at 25° C. The SAN-copolymer used was a standard commercial-grade resin consisting of 25 parts of acrylonitrile and 75 parts of styrene with an intrinsic viscosity $[\eta]$ of 0.9 dl/g. The production of the graft polymers is described in Examples 1 and 2.

The components are mixed in an internal kneader, spun off in the form of strands, granulated and injection-moulded into test specimens. Table 1 (graft polymer of Example 1) and Table 2 (graft polymer of Example 2) show the thermomechanical properties of the different polymer mixtures produced.

EXAMPLE 5

Mixtures of components 1, 2 and 3 according to the invention

The production of components 2 and 3 was described in Examples 1, 2 and 3. The BPA-polycarbonate was that of Comparison Example 4.

Table 3 (graft polymer of Example 1) and Table 4 (graft polymer of Example 2) show the thermomechanical values of the mixtures according to the invention which were produced by mixing the components in an internal mixer, granulation and injection-moulding into test specimens.

EXAMPLE 6

The properties of the mixtures of components 1 and 3 according to the invention are shown in Table 5 for various mixing ratios.

Table 1

| Mixture component | a | b | c | d | Test method according to DIN. | Units |
|---|---|---|---|---|---|---|
| BPA-PC | 50 | 50 | 50 | 50 | | |
| SAN-COP. | 17.6 | 25 | 35 | 40 | | |
| Graft polym. | 32.4 | 25 | 15 | 10 | | |
| Impact strength at room temperature | 49 | 49 | 49 | 49 | 53 453 | kJ/m² |
| Notched impact strength at room temperature | 59 | 61 | 3/47 | 27 | 53 453 | kJ/m² |
| E-modulus in flexure | 1520 | 1740 | 2030 | 2170 | 53 457 | MPa |
| Vicat B | 109 | 110 | 111 | 112 | 53 460 | °C. |
| BPA-PC | 40 | 40 | 40 | 40 | | |
| SAN-copolymer | 30.7 | 36.1 | 43 | 48 | | |
| Graft polymer | 29.3 | 23.9 | 17 | 12 | | |
| Impact strength at room temperature | unbr. | unbr. | unbr. | unbr. | 53 453 | kJ/m² |
| Notched impact strength at room temperature | unbr. | unbr. | 6/43 | 14 | 53 453 | k/m² |
| E-modulus in flexure | 1360 | 1960 | 2180 | 2370 | 53 457 | MPa |
| Vicat B | 105 | 107 | 108 | 108 | 53 460 | °C. | unbr. = unbroken

Table 2

| Mixture component | a | b | c | d | Test method according to DIN. | Units |
|---|---|---|---|---|---|---|
| BPA-PC | 40 | 40 | 40 | | | |
| SAN-cop. | 50 | 45 | 40 | | | |
| Graft polym. | 10 | 15 | 20 | | | |
| Rubber content of graft polym. | 62 | 62 | 62 | | | |
| Impact strength (room temperature) | unbr. | unbr. | unbr. | | 53 453 | kJ/m² |
| Notched impact strength (room temperature) | 6 | 11 | 28 | | 53 453 | kJ/m² |
| Flexural strength | 102 | 101 | 94 | | 53 452 | MPa |
| Deflection | 4.6 | 4.5 | 4.6 | | 53 452 | mm |
| E-modulus in flexure | 2400 | 2300 | 2200 | | 53 457 | MPa |
| Dimensional stability under heat according to Vicat B | 110 | 110 | 110 | | 53 460 | °C. |
| Ethylene-vinyl acetate content | 6 | 9 | 12 | | | % |

Table 3

| Mixture Component | a | b | c | d | Test method according to DIN. | Units |
|---|---|---|---|---|---|---|
| BPA-PC | 40 | 40 | 50 | 30 | | |
| SAMA-cop. | 36 | 27.6 | 17.5 | 37.8 | | |
| Graft polym. | 24 | 32.4 | 32.5 | 32.2 | | |
| Tensile strength | 40 | 37 | 36 | 39 | 53 571 | MPa |
| Elongation at break | 28 | 49 | 29 | 71 | 53 504 | % |
| Tensile stress | 48 | 41 | 39 | 44 | 53 455 | MPa |
| E-modulus in flexure | 2710 | 1870 | 1720 | 1980 | 53 457 | MPa |
| Impact strength at room temperature | unbr. | unbr. | unbr. | unbr. | 53 453 | kJ/m² |

Table 3-continued

| Mixture Component | a | b | c | d | Test method according to DIN. | Units |
|---|---|---|---|---|---|---|
| Notched impact strength at room temperature | 45 | 56 | 57 | 44 | 53 453 | kJ/m² |
| Vicat B | 120 | 116 | 117 | 114 | 53 460 | °C. | unbr. = unbroken

Table 4

| Mixture component | a | b | c | d | Test method according to DIN. | Units |
|---|---|---|---|---|---|---|
| BPA-PC | 40 | 40 | 40 | | | |
| SAMA-cop. | 50 | 40 | 35 | | | |
| Graft polym. | 10 | 20 | 25 | | | |
| Rubber content of graft polym. | 62 | 62 | 62 | | | |
| Impact strength (room temperature) | unbr. | unbr. | unbr. | | 53 453 | kJ/m² |
| Notched impact strength (room temperature | 8 | 15 | 25 | | 53 453 | kJ/m² |
| Flexural strength | 112 | 104 | 98 | | 53 452 | MPa |
| Deflection | 4.3 | 4.3 | 4.3 | | 53 452 | mm |
| E-modulus in flexure | 2550 | 2350 | 2200 | | 53 457 | MPa |
| Dimensional stability under heat according to Vicat B | 118 | 118 | 118 | | 53 460 | °C. |
| Ethylene-vinyl acetate content | 6 | 12 | 15 | | | |

Table 5

| Mixture component | a | b | c | d | Test method according to DIN. | Units |
|---|---|---|---|---|---|---|
| BPA- | 60 | 65 | 70 | | | |
| SAMA- | 40 | 35 | 30 | | | |
| Impact strength | unbr. | unbr. | unbr. | | 53 453 | kJ/m² |
| Notched impact strength | 8 | 10 | 12 | | 53 453 | kJ/m² |
| E-modulus in flexure | 2560 | 2450 | 2430 | | 53 457 | MPa |

Table 5-continued

| Mixture component | a | b | c | d | Test method according to DIN. | Units |
|---|---|---|---|---|---|---|
| Vicat B | 133 | 135 | 139 | | 53 460 | °C. | unbr. = unbroken

We claim:
1. A thermoplastic moulding composition comprising:
  (1) 80 to 20 parts by weight of a thermoplastic polycarbonate based on a dihydroxy diarylalkane,
  (2) 0 to 60 parts by weight of a graft copolymer of a
    (2.2) monomer mixture of
      (2.2.1) 95 to 50% by weight of styrene, methyl methacrylate or a mixture thereof; and
      (2.2.2) 50 to 5% by weight of acrylonitrile, methacrylonitrile or a mixture thereof,
  polymerised onto
    (2.1) a rubber which has a glass temperature below −20° C., and which contains less than 30 C═C-double bonds per 1000 carbon atoms, the moulding composition containing from 0 to 35% by weight of the rubber (2.1), and
  (3) 5 to 75 parts by weight of a copolymer which is chemically uniform in structure and comprises:
    (3.1) 95 to 50% by weight of styrene, methyl methacrylate or a mixture thereof;
    (3.2) 40 to 5% by weight of acrylonitrile, methacrylonitrile or a mixture thereof; and
    (3.3) 2 to 30% by weight of maleic acid anhydride, the sum of 3.1, 3.2 and 3.3 being equal to 100% by weight.

2. A thermoplastic moulding composition as claimed in claim 1, which contains from 5 to 25% by weight of the rubber (2.1)

3. A moulding composition as claimed in claim 1, wherein the copolymer (3) is produced from 15 to 30 parts by weight of acrylonitrile, 7.5 to 15 parts by weight of maleic acid anhydride and 77.5 to 55 parts by weight of styrene.

4. A moulding composition as claimed in claim 1, wherein the graft polymer (2) contains as rubber a terpolymer of ethylene, propylene and an unconjugated diene with less than 30 C═C-bonds per 1000 carbon atoms and a ratio by weight of ethylene to propylene of from 75:25 to 40:60.

5. A moulding composition as claimed in claim 4, wherein the diene component is 5-ethylidene norbornene or cyclopentadiene.

6. A moulding composition as claimed in claim 1, wherein the graft polymer (2) contains as rubber a copolymer of 40 to 70 parts by weight of ethylene and 60 to 30 parts by weight of vinyl acetate.

* * * * *